Patented June 1, 1943

UNITED STATES PATENT OFFICE 2,320,677

COVERING FOR ARC WELDING ELECTRODES

Clinton E. Swift, Wauwatosa, Wis., assignor to Ampco Metal, Inc., Milwaukee, Wis., a corporation of Wisconsin No Drawing. Application September 26, 1942, Serial No. 459,843

7 Claims. (Cl. 219—8)

This invention relates to coverings for arc welding electrodes and is applicable in the construction of covered electrodes of bronze or brass or other copper alloy.

The invention more particularly relates to the covering of such electrodes for metallic arc welding and to an improvement in the general type of covering set forth in the United States Letters Patent No. 2,238,392, granted to Milan A. Matush on April 15, 1941. In this patent the covering disclosed comprised in its specific form sodium fluoride and cryolite in substantially equal parts by weight and a binder of sodium silicate.

The principal object of the present invention is to improve the mechanical properties of the covering, including its ability to dry out and resist the re-absorption of moisture, its adherence to the rod, its resistance to cracking and spalling off in handling and transportation, and the like.

Another object of the invention is to provide an electrode covering for copper alloy and particularly bronze electrodes which is more readily applied to the electrode.

Another object is to provide an electrode covering for copper alloy and particularly bronze electrodes which will produce a smoother arc in welding and a more sound deposit.

In accordance with the invention, the covering contains a substantial quantity of a filler material, preferably inert to the weld metal and base metal. The filler material is selected and processed to avoid any objectionable deposit of the inert material in the slag resulting from the fluxing action of the covering.

Filler materials which have been found particularly suitable are carbon in the form of coarse graphite particles or ground petroleum coke, and ground glass preferably of the boro-silicate type.

A suitable covering composition is as follows:

| | Parts by weight |
|---|---|
| Sodium fluoride | 40 |
| Cryolite | 40 |
| Filler material | 20 |

Sufficient sodium silicate solution to serve as a binder.

The cryolite is a complex fluoride and may be omitted in favor of additional sodium fluoride, or the latter may be omitted in favor of additional cryolite, and the like.

In applying the covering, the dry ingredients are usually mixed first and then the sodium silicate solution added. Where the electrodes are to be dipped in the composition, an additional amount of water should be added to make the consistency of the bath suitable for dipping.

After dipping or other application of the coating to the electrodes, the latter are placed in an oven where the coating is dried, preferably at about 400° F. The coating before drying may contain from 25% to 30% of moisture by weight. After drying at the temperature stated, the coating will normally contain only about 5% of moisture, usually in a chemically combined state, there being very little, if any, free moisture. This final moisture content of the covering is very uniform and is substantially the same for each electrode, a feature not present in this type of covering prior to the discovery of the present invention.

It is believed that the filler material increases the permeability of the covering, and thereby facilitates the more rapid and uniform drying. This uniformity enables the use of more intensive drying without rupture or cracking of the covering. Where several dippings are employed, the coating may be air-dried in between successive dippings and heated for drying after the last dip. After once being dried as described, the covering does not readily take on moisture during storage or transportation and its operating characteristics do not change. Where the covering is extruded, the filler material adds bulk and provides a more satisfactory control of the consistency of the covering.

The range of particle size of the filler material should be carefully controlled. It has been found generally that a range of minus 60 mesh plus 120 mesh has been most satisfactory. Particles larger than 60 mesh interfere with the normal action of slag formation, whereas particles smaller than 120 mesh give an objectionable bulk to the slag without materially contributing any improvement in accordance with the invention. By "minus 60 mesh" size is mean material that will pass through a screen having 60 openings to the lineal inch, and by "plus 120 mesh" is meant material that will be retained by a screen having 120 openings per lineal inch. It is believed that this closely-sized filler material acts in a manner analogous to the coarse aggregate added to concrete mixtures for the purpose of increasing the strength of the mass.

Where petroleum coke is employed, the hydrocarbon constituent should be low or substantially removed. The filler should not contain moisture or other objectionable constituents, and it should have such low solubility in the water solution of sodium silicate as to maintain its original size limitations.

The electrode covering provided by the invention has the ability to dry quicker and to a more uniform final moisture content. It adheres better to the electrode core and does not crack or spall off either with age or with handling. A smoother arc is obtained with the covering and by reason of its greater uniformity of moisture content and the smallness thereof the deposits are more sound and have less tendency to contain blowholes and the like.

While the covering provided by the invention is particularly suitable for bronze and brass welding electrodes, it may find use on electrodes of various alloys.

Various substantially inert filler materials may be used and various embodiments of the invention employed within the scope of the accompanying claims.

I claim:

1. A covering for arc welding electrodes of the class described comprising one or more fluorides, a binder of sodium silicate, and a substantially inert filler material to increase the mechanical strength of the covering for handling and shipping purposes.

2. A covering for arc welding electrodes of the class described comprising one or more fluorides, a binder of sodium silicate, and a substantially inert filler material to increase the mechanical strength of the covering for handling and shipping purposes, said covering being substantially devoid of free moisture content and having a low combined moisture content.

3. A covering for arc welding electrodes of the class described comprising one or more fluorides, a binder of sodium silicate, and a substantially inert carbonaceous filler material.

4. A covering for arc welding electrodes of the class described comprising one or more fluorides, a binder of sodium silicate, and a substantially inert filler material of ground glass.

5. A covering for arc welding electrodes of the class described, comprising one or more fluorides, a binder of sodium silicate, and a substantially inert filler material of a particle size that will pass through a 60 mesh screen and in excess of that which passes through a screen of 120 mesh per inch to increase the mechanical strength of the covering for handling and shipping purposes.

6. A covering for arc welding electrodes of the class described comprising sodium fluoride and cryolite in about equal parts by weight, a filler material to increase the mechanical strength of the covering for handling and shipping purposes, and sodium silicate added as a binder.

7. A covering for arc welding electrodes of the class described comprising sodium fluoride and cryolite in about equal parts by weight, a filler material by weight equal to about 25% of the combined weight of said fluoride and cryolite, and sodium silicate added as a binder.

CLINTON E. SWIFT.